United States Patent [19]
Svensson

[11] 3,823,893
[45] July 16, 1974

[54] SAFETY HARNESS

[76] Inventor: Gustav Einar Wilhelm Svensson, Villa Solhall, Box 61, S310, 33 Holm, Sweden

[22] Filed: Nov. 6, 1972

[21] Appl. No.: 303,686

[30] Foreign Application Priority Data
Nov. 29, 1971 Sweden............................ 15238/71

[52] U.S. Cl................................. 242/107.4, 74/578
[51] Int. Cl....................... A62b 35/02, B65h 63/04
[58] Field of Search........... 242/107.4, 107.2, 107.3, 242/107.5, 107.6, 107.7; 280/150 SB; 297/386, 388; 188/82.7; 74/578

[56] References Cited
UNITED STATES PATENTS

| | | | |
|---|---|---|---|
| 3,323,749 | 6/1967 | Karlsson | 242/107.4 |
| 3,343,763 | 9/1967 | Spouge | 242/107.4 |
| 3,395,873 | 8/1968 | Norris | 242/107.4 |
| 3,430,891 | 3/1969 | Burleigh | 242/107.4 |
| 3,508,720 | 4/1970 | Kell | 242/107.4 |
| 3,521,832 | 7/1970 | Rex | 242/107.4 |

Primary Examiner—John W. Huckert
Assistant Examiner—Jon W. Henry
Attorney, Agent, or Firm—Robert E. Burns; Emmanuel J. Lobato; Bruce L. Adams

[57] ABSTRACT

A blocking means in vehicle safety harnesses of the kind having a reel mechanism comprising a ratchet wheel with which the blocking means engages to lock the reel mechanism against further unwinding of the harness. The blocking means is floating freely in a cavity formed in a ring surrounding the ratchet wheel such that during normal use of the harness said blocking means is in a position beyond the circle of engagement of the ratchet wheel but upon tilting of the harness device as a result of an abnormal situation, the blocking means is actuated into engagement with the ratchet wheel, thus preventing further unwinding of the harness.

15 Claims, 8 Drawing Figures

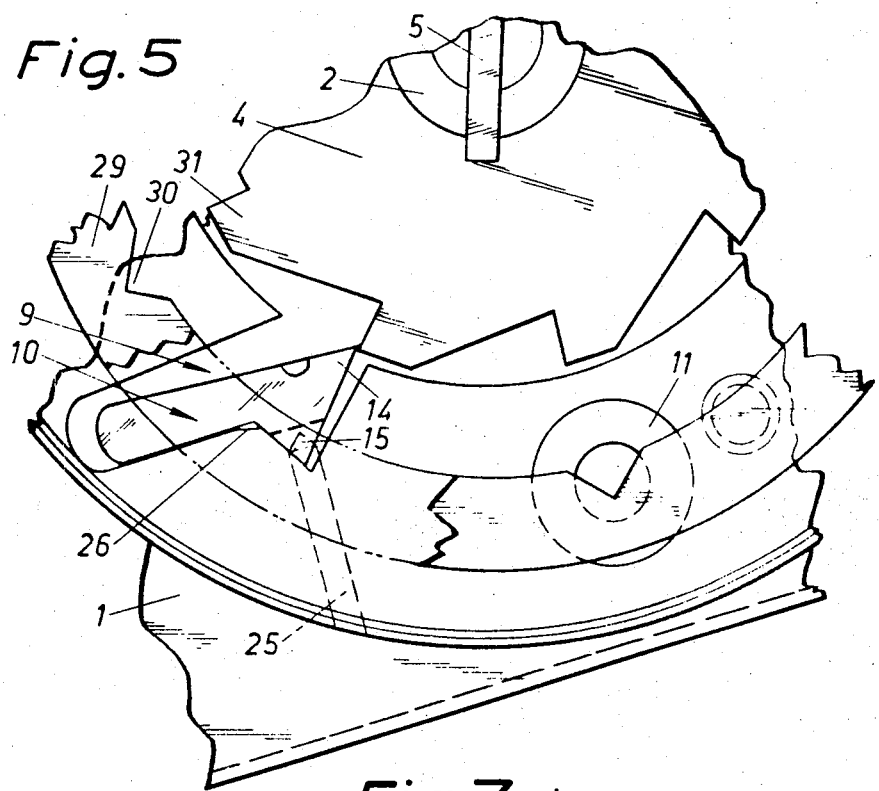
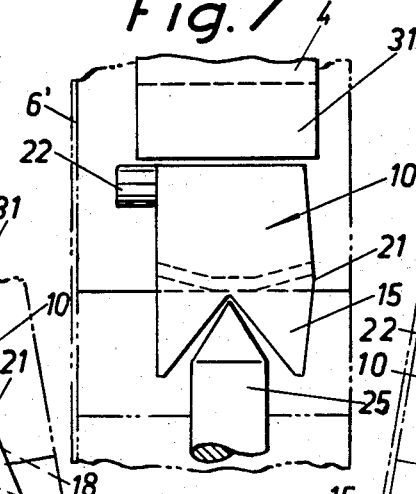
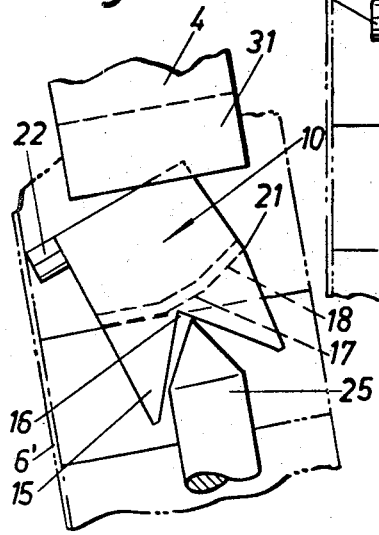
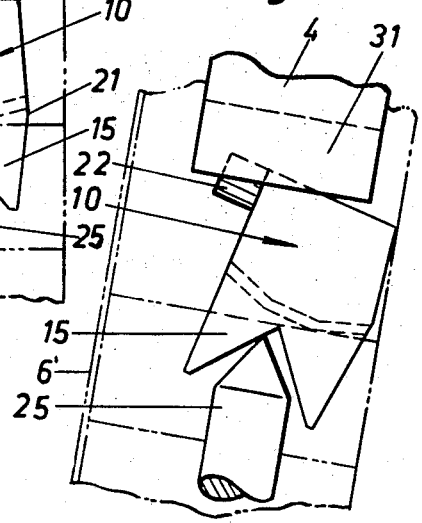

SAFETY HARNESS

BACKGROUND OF THE INVENTION

The present invention concerns an improvement in vehicle reel safety harnesses of the kind incorporating a reeling mechanism permitting winding and unwinding of the harness, and comprising a ratchet wheel rotating with the reel spindle of the harness, a blocking mechanism for engagement with the ratchet wheel teeth, and a spring acting to prevent unwinding of the harness.

In order to comply with regulations, force safety harnesses of this kind must be provided with a mechanism locking the harness device against winding movement when the vehicle is tilted above a certain angle in either direction, and preventing further unwinding of the harness.

Many mechanisms for this purpose are already known, most of which use the principle with a pendulum adjusting itself to the direction of the gravitational forces and actuating the blocking mechanism to lock the harness in oblique positions of the vehicle. All prior art mechanisms of this kind are, however, rather complicated and for this reason require careful maintenance and thorough servicing to function satisfactorily, in addition to which these kinds of mechanisms are very expensive.

SUMMARY OF THE INVENTION

The present invention has for its purpose to provide a mechanism for vehicle safety harnesses of the reel-type, this mechanism presenting an extremely simple solution to the problem outlined above and, on account of its simplicity, requiring only minimal servicing and maintenance. For this purpose the mechanism in accordance with the present invention is characterised in that the blocking means is arranged outside the teeth of the blocking ratchet wheel in a free-floating position in a cavity open in the direction facing towards said ratchet wheel, and is arranged, when the harness device assumes an oblique position at an angle deviating by a certain value from the horizontal plane either forwards-backwards or laterally, to slide or tip into engagement with any one of the teeth of the blocking ratchet wheel.

This arrangement in accordance with the invention provides an inexpensive and very reliable vehicle safety harness.

BRIEF DESCRIPTION OF THE DRAWINGS

The invention will be described more in detail in the following with reference to the accompanying drawings, wherein FIG. 5 is a lateral view illustrating the blocking means in the position it assumes when the harness device is tilted in the opposite direction of inclination from the one illustrated in FIG. 3, and FIGS. 6, 7 and 8 illustrate the blocking means from the front in the position it assumes upon tilting to one side, when in rest, and upon tilting to the opposite side of the harness device.

DETAILED DESCRIPTION OF A PREFERRED EMBODIMENT

Figure 1:
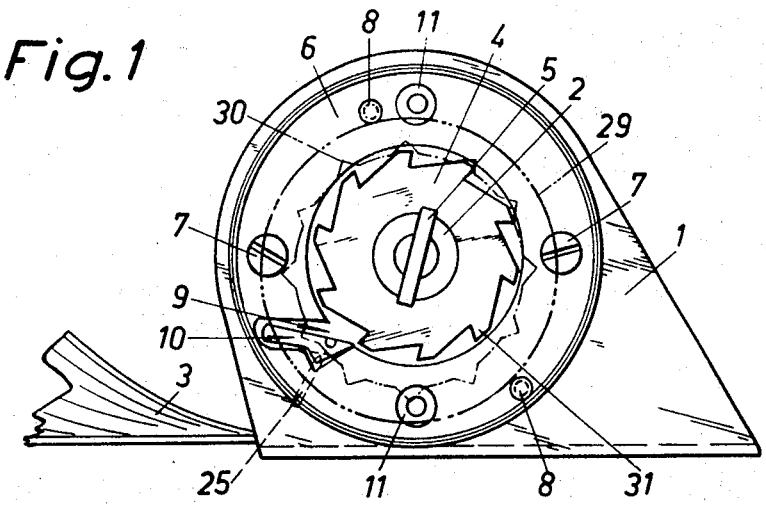
FIG. 1 is a side view of a reeling mechanism in accordance with the invention.
Figure 2:
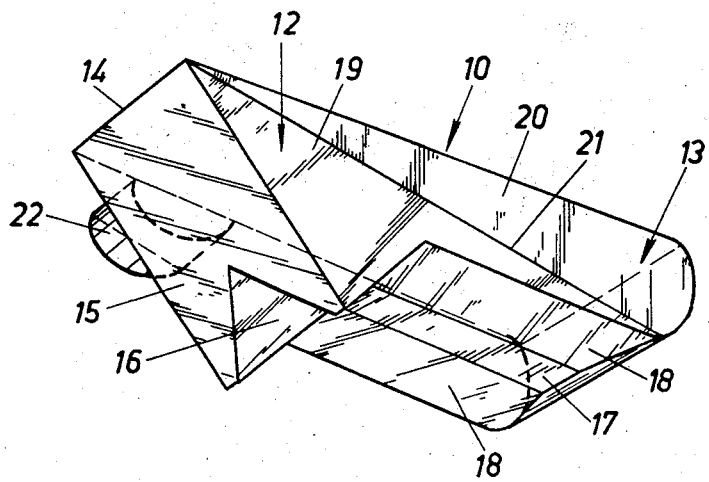
FIG. 2 illustrates the blocking means proper in a perspective view and on an enlarged scale.

As appears from the embodiment illustrated in the drawings the invention in accordance with the present invention incorporates a securing fixture 1 for attaching the harness to the vehicle, a reel spindle 2 for the harness 3 and its reel spring (not illustrated) being mounted in said fixture. At one end of the reel spindle 2 is provided a ratchet wheel 4 which is locked thereto by means of a locking key 5. A thick-walled ring 6 is by means of screws 7 attached in a position extending radially around the ratchet wheel 4, said ring being provided with a lid 6' outside the ratchet wheel and with threaded holes 8 to accommodate screws to secure the lid. A cavity 9 is formed in the ring and a blocking means or member 10 is located in said cavity. Additional holes 11 for the screws 7 are likewise provided in the ring to make possible to attach the ring in various different positions in relation to the securing fixture, depending upon the position of mounting of the latter in the vehicle.

In the cavity 9 which is open in the direction facing inwards towards the ratchet wheel 4 the blocking means 10 is positioned so as to float freely. The configuration and arrangement of the blocking means and the cavity are such as to make the blocking means 10 slide or tip into engagement with any one of the teeth of the ratchet wheel 4, when the harness device assumes an oblique position in any direction at an angle exceeding a certain value. For this purpose the blocking means 10 is formed with a forward wedge-like head 12 and with a rearward portion 13. The head 12 is provided with an engagement wedge 14 facing the ratchet wheel 4 and with a wedge apex 15 facing downwards. Both wedge edges extend transversely to the longitudinal axis of the blocking means. The wedge apex 15 facing downwards is provided at its middle portion with a wedge-shaped notch 16, said notch 16 extending transversely relative to the edge. The lower surface of the rearward portion 13 is formed with a narrow, longitudinally extending middle surface area 17 and with a surface area 18 extending obliquely upwards on either side of area 17. The surface of the blocking means 10 facing the inner wall of the cavity 9 is divided into two part surfaces 19 and 20, respectively, extending at a slight angle with relation to one another, whereby an edge 21 is formed, extending from the apex of the engagement wedge 14 of the blocking means 10 obliquely backwards and downwards along the side face of this means. In addition, the head 12 of the blocking means 10 is formed on its face turned outwards with a shoulder 22.

In conformity with the blocking means 10, the cavity 9 is formed with a rearward portion 23 and a forward, V-shaped notch 24. In the centre of the V-shaped notch is arranged an upright guide pin 25 engaging in the notch 16 formed in the head 12 of the blocking means 10.

When the harness device is in its normal or rest position, the blocking means 10 seats both on a bottom area 26 forming an angle with the rest of the bottom area of the rearward portion 23 by means of that part of the rear portion 13 that is closest to the head 12, and on the mouth edge of the cavity 9 by means of the outer portion of the engagement wedge 14. On account of the action of the guide pin 25, the blocking means 10 is centered laterally in the middle of cavity 9.

Figure 4:
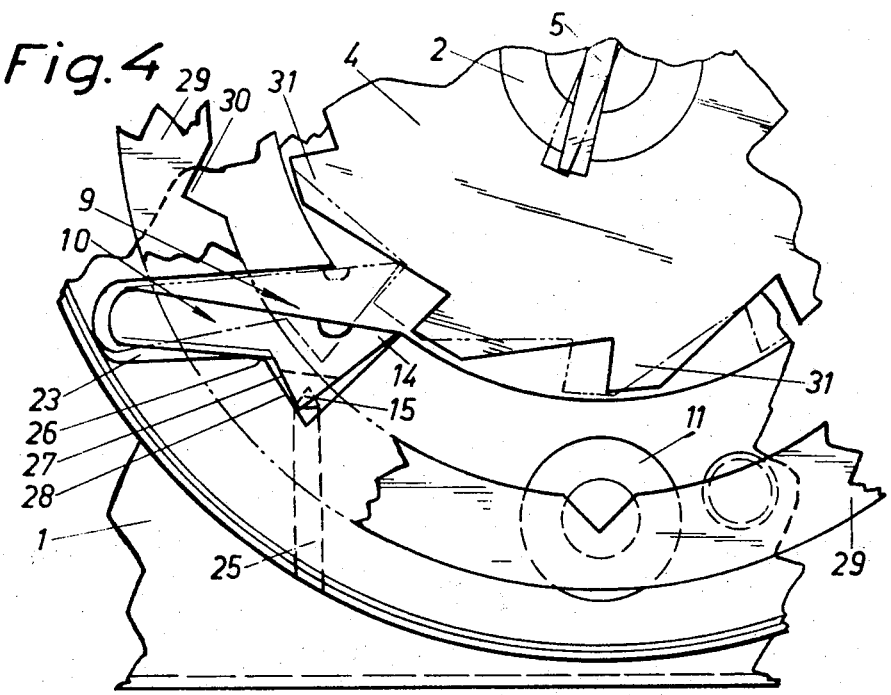
FIG. 4 is a side view illustrating the various positions of the blocking means, the full lines representing its position of rest and the dash-and-dot lines representing its position of complete engagement with the ratchet wheel.
Figure 3:
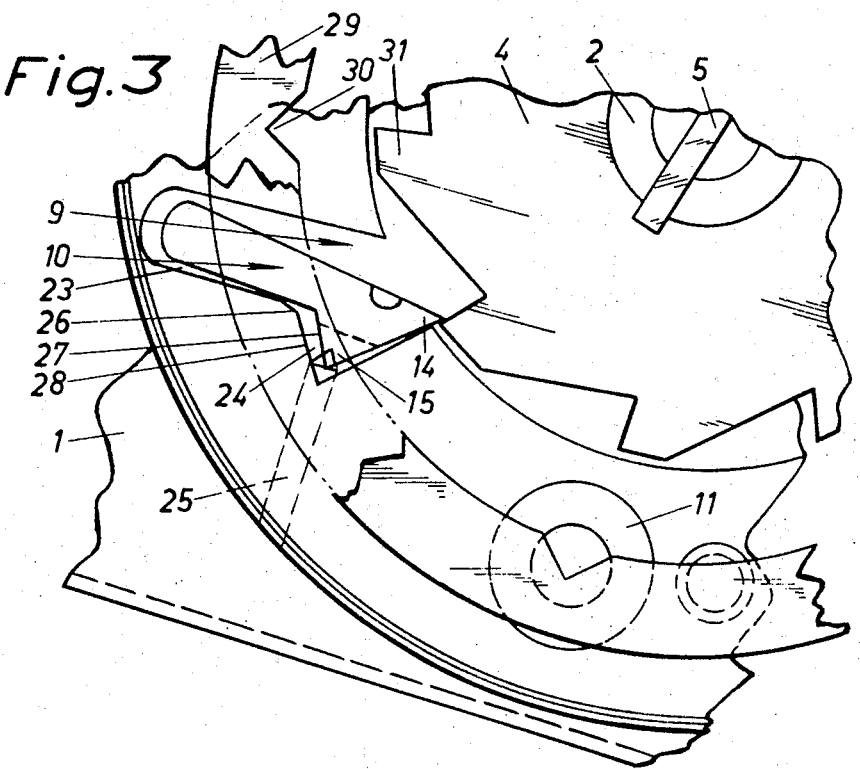
FIG. 3 is a side view illustrating the position of the blocking means assumed, when the safety device mounted in the vehicle is tilted to one side in the rotational plane of the ratchet wheel.

If one assumes that the harness device is inclined to a sufficient degree, for instance on the direction illustrated in FIG. 3, the blocking means 10 will slide towards the mouth of the cavity 9 on account of the effects of the gravitational forces, this sliding motion taking place with ease, as the areas of contact are small. The engagement wedge 14 will then be in a position within the circle of engagement of the ratchet wheel 4 and in case the ratchet wheel 4 turns to pay out a further length of harness, the blocking means 19 will engage a tooth of the ratchet wheel 4, the latter, when moving, carrying the blocking means backwards into its cavity 9. During this movement the rearward surface 27 of the downwards facing wedge apex 15 and the corresponding surface 28 formed in the V-shaped notch 24 cooperate to lift the head 12 of the blocking means 10 into complete engagement with the ratchet wheel 4. Only then is the blocking means 10 home in the bottom of the cavity 9 and the unwinding of the harness stopped, possibly not until the blocking means reaches the ceiling of the cavity (see dash-and-dot lines in FIG. 4).

If, on the other hand, the harness tilts sufficiently in the opposite direction (FIG. 5) the rearward portion 13 of the blocking means 10 will tip down into engagement with the bottom of the cavity 9, whereby the engagement wedge 14 of the head 12 will again be positioned within the circle of engagement of the ratchet wheel 4. If the latter performs a rotational movement for unwinding, the same blocking procedure as the one described above will take place.

FIGS. 6, 7 and 8 illustrate the positions of the blocking means 10 as seen from the front when tilting in the two lateral directions and in normal position, respectively. As previously mentioned, the blocking means 10 is supported in normal position by a part of its engagement wedge 14 and by a part of its rear portion 12. As the rear portion 12 is formed with a narrow middle surface 17 on its lower surface, the blocking means may easily tip over to either side upon tilting, as illustrated in FIGS. 6 and 8, such that the blocking means 10 tips over into a position resting on one of the oblique faces 18. This tipping is facilitated upon tilting inwards (FIG. 6) because of the edge 21 formed on the inner face of the blocking means 10. When the blocking means tips outwards the considerations are different, as will be described more in detail in the following. In both these cases of tilting a part of the engagement wedge will be positioned within the engagement circle of the ratchet wheel and upon the possible rotation thereof essentially the same course of action takes place as in the cases described with tiltings backwards and forwards, respectively. Upon lateral tilting, the guide pin 25 to some extent contributes to bringing the blocking means into engagement with the ratchet wheel.

In order to enable the harness to lock also in case the harness is pulled out rapidly, as the tendency will be upon a collision, the harness is provided with a runner ring 29 the inner diameter of which is somewhat larger than the outer diameter of the ratchet wheel 4. The runner ring 29 is attached around the periphery of the ratchet wheel 4 and turns together therewith upon rotation. The shoulder 22 of the blocking means is then positioned in the gap formed between the runner ring 29 and the ratchet wheel 4, directly beneath the latter, said gap being formed as a consequence of the difference in diameters. A rapid pulling force exerted on the harness 3 will result in a rapidly accelerating rotational movement of the ratchet wheel and upon such rapid acceleration, the runner ring 29 on account of its inertia will at first move in the direction of the tangent at the point of contact. This diminishes the gap in which the shoulder 22 of the blocking means 10 is located such that the runner ring 29 will contact the shoulder 22 and thereby lift the latter and thus also the blocking means 10 upwards, bringing the latter means into engagement with the ratchet wheel 4, and consequently the unwinding movement is stopped. The runner ring 29 may be provided with small notches 30 along its runner periphery for engagement by the teeth 31 of the ratchet wheel 4 in order to provide for safer participation of the runner ring in the movement of the ratchet wheel 4.

When the harness means takes an oblique position such that the blocking means will tip outwards, the run ring 29 easily yields away, for which reason it is not necessary to provide the outer surface of the blocking means with an edge corresponding to edge 21 on the inner surface thereof.

The invention is not limited to the embodiment as illustrated and described above but several modifications are possible within the scope of the appended claims. To facilitate tipping of the blocking means upon tilting obliquely forwards to the side, the blocking means may be provided with a vertical tipping edge approximately at the point of transition between head and rearward portion. Instead of forming the rear bottom of the cavity at an angle, the lower face of the blocking means may be angled, which has the same effect. The essential details of the invention are the arrangement of the blocking means and the cavity and the configuration of these means. Otherwise, the harness device and its spring mechanism may be formed in various ways but it is essential that a ratchet wheel is provided and arranged for rotation together with the spindle upon winding-in of the harness. The runner ring to block against rapid unwinding of the harness is in principle known from the Swedish Patent Specification No. 335,072.

What I claim is:

1. In vehicle reel safety harnesses of the kind having an angularly displaceable housing fixed to a vehicle during use, a reel mechanism disposed in said housing and comprising a reel spindle, a ratchet wheel having teeth fixed with respect to and rotating with said reel spindle, and a spring acting against unwinding of said harness, the improvement comprising means defining a cavity in said housing and having an open end portion facing towards said ratchet wheel, and blocking means arranged in a free-floating state unconnected to said housing and disposed in said cavity a portion of one wall of said cavity supporting said blocking means for slidable and tippable movement from a rest position in response to a predetermined angular displacement of said housing into engagement with one of the teeth of said ratchet wheel.

2. A improved blocking means in accordance with claim 1, wherein said blocking means comprises a wedge-shaped head portion disposed at the open end portion of said cavity and an elongated rear portion and wherein the portion of said rear portion closest to said head portion and an end portion of said head portion contact said cavity when said blocking means is in said rest position, and wherein said cavity has a rearward portion having a narrower cross section than said open end portion thereof.

3. An improved blocking means in accordance with claim 2, wherein said blocking means comprises a narrow central surface on the lower face of said rear portion, said narrow central surface extending longitudinally along said blocking means, and two oblique surfaces each disposed on one side of said central surface.

4. An improved blocking means in accordance with claim 2, wherein said blocking means further comprises a longitudinally extending tipping edge between said narrow central surface and one of said oblique surfaces.

5. An improved blocking means in accordance with claim 2, where said blocking means further comprises an oblique surface on said head portion and a wedge-shaped bottom portion formed in said head portion, and wherein said cavity has a V-shaped notch therein receiving said wedge-shaped portion, and an oblique surface formed in said V-shaped notch in said cavity coactive with the oblique surface of said head portion to bring said blocking means upwards and backwards to allow said head portion to fully engage with a ratchet tooth upon application of pressure and contact by the ratchet tooth against the head portion.

6. An improved blocking means in accordance with claim 2, wherein said rearward portion of said blocking means is somewhat shorter than the rearward portion of said cavity to ensure complete engagement of said blocking means with said ratchet wheel before said rearward end of said blocking means abuts against said rear wall of the cavity, said abutment resulting in prevention of further unwinding movement of said reel spindle.

7. An improved blocking means in accordance with claim 2, comprising a V-shaped notch in the lower portion of said head, a guide pin mounted in said housing and projecting into said cavity to engage with said notch in order to return said blocking means into the rest position in said cavity after resetting of said harness device to its normal position, and to lift said head portion upon lateral tilting of said harness device.

8. An improved blocking means in accordance with claim 2, further comprising a ring surrounding said ratchet wheel and being arranged for adjustment into various angular position in the plane of said ratchet wheel to urge said blocking means into engagement with a ratchet tooth when said spindle reel unwinds at an angular velocity greater than a preselected value.

9. An improved blocking means in accordance with claim 1, wherein said blocking means comprises a wedge-shaped head portion and a rearward elongated portion, and wherein said blocking means abuts the bottom of said cavity both at a section of its said rearward portion positioned close to said head portion and at the wedge apex of said head portion when said blocking means is in the rest position, a narrow central surface on the lower face of said rear portion of said blocking means, said narrow central surface extending in the longitudinal direction of said blocking means, two oblique surfaces, one such surface being provided on each side of said central surface, a longitudinally extending tipping edge on the blocking means between said narrow central surface and one of said oblique surfaces, a wedge-shaped bottom portion on said head portion of said blocking means, a V-shaped notch in said cavity to accomodate said wedge-shaped portion, a rearward oblique surface on said wedge-shaped bottom portion of said blocking means, a corresponding oblique surface formed in said V-shaped notch in said cavity coactive with the oblique surface of said head portion to bring said blocking means upwards and backwards to allow said head to fully engage with a ratchet tooth upon application of pressure and contact by the ratchet tooth against the head portion, wherein said rear portion of said blocking means being somewhat shorter than the said rearward portion of said cavity to ensure complete engagement of said blocking means with said ratchet wheel before said rear portion of said blocking means abuts against the rear wall of the cavity, said abutment resulting in prevention of further unwinding movement of said reel spindle, a V-shaped notch in the lower portion of said head portion, a guide pin mounted in said housing and projecting into said cavity to engage with said notch in order to return said blocking means into the rest position in said cavity after resetting of said harness device to its normal position, and to lift said head portion upon lateral tilting of said harness device, and a ring surrounding said ratchet wheel and being arranged for adjustment into various angular positions in the plane of said ratchet wheel to urge said blocking means into engagement with a ratchet tooth when said spindle reel unwinds at an angular velocity greater than a preselected value.

10. In a vehicle safety harness apparatus of the kind having a housing fixed to a vehicle during use and angularly displaceable relative to a given plane, and a reel mechanism in the housing comprised of a reel spindle rotatable in both a winding and an unwinding direction, a toothed ratchet wheel fixed to and rotating with the reel spindle and means biasing the reel spindle in the winding direction, wherein the improvement comprises: means defining a cavity in said housing having an open end portion facing the ratchet teeth; and blocking means comprising a member disposed in said cavity in a free floating state unconnected to said housing wherein a portion of one wall of said cavity supports said member for slidable and tippable movement from a rest position for engaging with one of the ratchet teeth to block the rotation of said reel spindle in the unwinding direction in response to a predetermined angular displacement of said housing relative to said given plane.

11. In a vehicle safety harness apparatus according to claim 10, wherein said cavity has a V-shaped inset at the open end portion thereof comprising one oblique surface and an elongated closed end portion terminating in an end wall, and wherein said member comprises a wedge shaped head portion having an apex contacting the open end of said cavity when said member is in said rest position, a V-shaped portion adjacent thereto and configured to rest in said V-shaped inset and having an oblique surface coactive with said oblique surface in said cavity to permit said member to slide therealong into engagement with a ratchet tooth from the rest position and an elongated rear portion having the end portion thereof closest to said head portion contacting the cavity when said member is in the rest position and the other end thereof in contact with the end walls of said cavity when a ratchet tooth is in contact with the apex of said wedge shaped head portion to enable said head portion to fully engage with a ratchet tooth.

12. In a vehicle safety harness apparatus according to claim 11, wherein said member further comprises a V-shaped notch in said V-shaped portion having a vertex parallel to the longitudinal axis of said member, and means coacting with said notch for centering said member when said member is in said rest position and for urging said member towards said ratchet teeth when said member tilts in response to angular displacement of said housing.

13. In a vehicle safety harness apparatus according to claim 12, wherein said means for centering comprises a guide pin mounted in said housing and projecting into said cavity to engage with said notch.

14. In a vehicle safety device according to claim 10, means for urging said blocking means into engagement with one of said ratchet teeth in response to the angular velocity of said reel spindle greater than a predetermined value.

15. In a vehicle safety device according to claim 14, wherein said means comprises a shoulder projecting from said blocking means and a ring disposed concentrically about said ratchet wheel and movable towards same to engage with said shoulder to urge said blocking means into contact with one of the ratchet teeth.

* * * * *